Nov. 26, 1968  J. W. JACOBS  3,412,621
ROLLER DRIVE MECHANISM FOR DOMESTIC APPLIANCE
Original Filed Feb. 16, 1966  2 Sheets-Sheet 1

INVENTOR.
James W. Jacobs
BY
J. C. Evans
HIS ATTORNEY

Nov. 26, 1968    J. W. JACOBS    3,412,621
ROLLER DRIVE MECHANISM FOR DOMESTIC APPLIANCE
Original Filed Feb. 16, 1966    2 Sheets-Sheet 2

INVENTOR
James W. Jacobs
BY
J.C. Evans
HIS ATTORNEY

United States Patent Office 3,412,621
Patented Nov. 26, 1968

3,412,621
ROLLER DRIVE MECHANISM FOR
DOMESTIC APPLIANCE
James W. Jacobs, Dayton, Ohio, assignor to General
Motors Corporation, Detroit, Mich., a corporation of
Delaware
Original application Feb. 16, 1966, Ser. No. 527,931, now
Patent No. 3,331,227, dated July 18, 1967. Divided and
this application May 9, 1967, Ser. No. 637,305
9 Claims. (Cl. 74—190)

ABSTRACT OF THE DISCLOSURE

In preferred form, a friction roller drive mechanism for a washer or the like including a reversible electric motor having an output shaft, a driving pinion on said shaft, means including said driving pinion forming a fluid coupling between it and the shaft, and self-energizing friction roller drive components engageable with the outer surface of the driving pinion for receiving power transferred from the output shaft through the fluid coupling to the driving pinion.

---

This application is a division of Ser. No. 527,931, filed Feb. 16, 1966, now U.S. Patent No. 3,331,227.

This invention relates to domestic appliances and more particularly to an improved roller drive mechanism for agitating and spinning in a clothes washer.

Roller drive mechanisms such as taught in the patent to Brucken, 3,087,321, issued Apr. 30, 1963, are characterized by the use of relatively low-cost, reliable and smooth operating self-energizing rollers serving as idler members between a drive motor and a driven transmission for producing either agitate or spin phases of operation in a clothes washer mechanism. In certain clothes washers, an agitator mechanism is present which can produce a high-load and high-differential speed condition on the transmission for operating the agitator. In roller drive mechanisms of the type set forth in the above-mentioned patent, such variable conditions can cause an undesirable irregular and accelerated wear of the rollers and other components of the washer power transmission.

An object of the present invention, therefore, is to improve washer transmissions of the roller drive type by the provision therein of means for operatively connecting self-energizing rollers of the drive mechanism to a drive motor through fluid coupling means for maintaining substantially a constant drive torque on the idler rollers in the self-energizing roller drive mechanism thereof by limiting the power output from the drive motor at a predetermined maximum value.

A further object of the present invention is to improve roller drive mechanism means for association with domestic washers or like appliances having driven components operative at variable load and speed conditions wherein the roller drive mechanism means includes a self-energizing idler roller means drivingly disposed between a driving pinion and a driven output shaft and driven into driving engagement and operative upon a predetermined rotation of the driving pinion to drivingly connect the driven shaft to the motor by the provision of fluid coupling means between the driving pinion and an output shaft from the drive motor operative to maintain the drive torque of the self-energizing roller component substantially constant irrespective of variations in the loading and the speed of operation of the driven output shaft whereby the self-energizing roller component is subjected to less wear and to a more even wear pattern.

Still another object of the present invention is to improve a roller drive mechanism means of the type set forth in the preceding object wherein the driving pinion in the system forms the housing for the fluid coupling means operatively connecting the drive pinion to the motor shaft.

Further objects and advantages of the present invention will be apparent from the following description, reference being had to the accompanying drawings wherein a preferred embodiment of the present invention is clearly shown.

Figure 1:
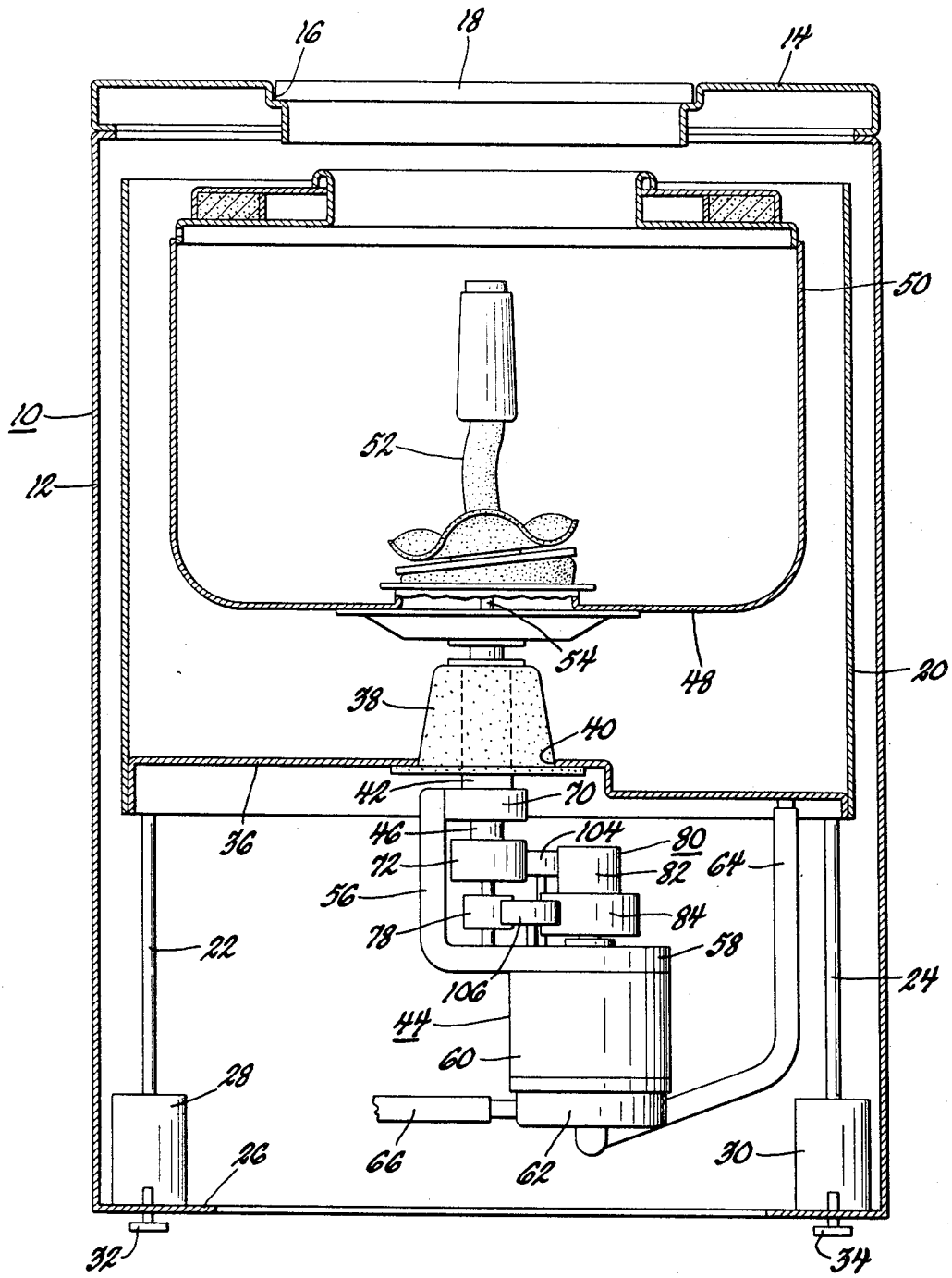
FIGURE 1 is a view in vertical section of a clothes washer including the improved roller drive agitate and spin mechanism of the present invention.

Referring now to the drawings, in FIGURE 1 a domestic washer 10 is illustrated including an outer casing 12 having a top 14 with an opening 16 therein closed by a vertically pivotal closure member 18. Within the casing 12 is supported a movable water container 20 secured to upwardly directed struts 22, 24 secured to a base 26 of the casing 12 through coupling members 28, 30, respectively. On the base 26 is located a plurality of adjustable legs 32, 34 at the diagonal corners of the base 26 for supporting the appliance 10 on a floor.

The water container 20 has a bottom bulkhead 36 on which is located a resilient support member 38 about an opening 40 in the bulkhead 36 which is sealed by suitable gasket means. The support member 38 has a housing 42 of the improved roller drive mechanism 44 of the present invention suspended therefrom out of which is upwardly directed a spin shaft 46 secured to the base 48 of a rotatable spin tub 50 in which is located a nutating agitator mechanism 52 of the type more specifically set forth in United States Patent No. 2,924,086, issued Feb. 9, 1962, to Fields. The agitator 52 is movable about a vertical axis in a wobbling or tilting movement by a mechanism (not shown) which is driven by an agitator shaft 54 connected thereto and directed concentrically through the spin shaft 46.

Referring now more particularly to the improved roller drive mechanism 44, the support housing 42 includes a C-shaped mounting bracket 56 having one end 58 thereof fixedly secured to a reversible electric motor 60. The motor 60 in the illustrated arrangement has a drain pump 62 secured to the base thereof which draws fluid from a drain conduit 64 and discharges it through an outlet conduit 66 to a suitable drain.

Figure 2:
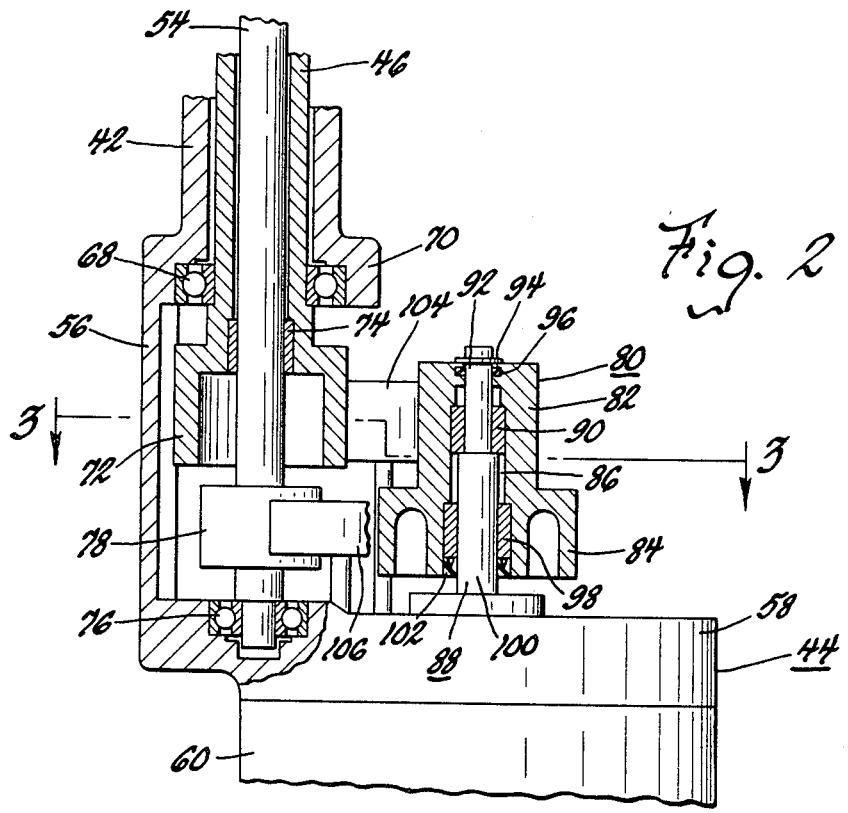
FIGURE 2 is an enlarged, sectional view of the improved roller drive agitate and spin mechanism partly in elevation, showing the arrangement of the fluid coupling unit in the system with respect to the self-energizing idler roller components thereof and the driven shafts thereof.

As best illustrated in FIGURE 2, the spin shaft 46 is rotatably supported within the housing 42 by a ball bearing 68 supported in a collar 70 formed at the upper end thereof. The shaft 46 is directed outwardly of the lower end of housing 42 and has the lower end thereof formed as a drum 72 constituting a spin drum in the drive mechanism 44 of the present invention. The spin drum 72 carries a sleeve bearing 74 which rotatably supports the agitate shaft 54 as it extends exteriorly of the lower end of housing 42 and the lower end of the agitate shaft 54 is received in a ball bearing assembly 76 supported on the bottom of the housing 42. An agitate drum 78 is secured to the shaft 54 beneath the spin drum 72 and is maintained in a colinear relationhsip with the spin drum 72 by the bearings 74, 76.

The spin drum 72 and agitate drum 78 are located in close proximity to a driving pinion 80 that has a small diameter upper portion 82 located substantially in the plane of the drum 72 and a larger diameter portion 84 located in the plane of the agitate drum 78. The driving pinion 80 has an opening 86 therein through which is directed a drive shaft 88 from the motor 44. A first sleeve bearing 90 located within the opening 86 and supported by the inner periphery of the driving pinion 80 rotatably supports a small diameter outwardly directed end 92 of the shaft 88 that is connected by suitable means such as a snap ring 94 against the driving pinion 80 to prevent axial outward movement of the pinion 80 on the shaft 88. A seal 96 in the head of pinion 80 prevents fluid leakage from the opening 86 exteriorly of the driving pinion 80 about the shaft end 92. Another sleeve bearing 98 is supported at the opposite end of the driving pinion 80 to rotatably support a large diameter end 100 of the shaft 88 for rotation with respect to the driving pinion 80 and an annular seal 102 in the base of pinion 80 seals the outer periphery of the shaft 88 at this location.

In accordance with certain principles of the present invention, a suitable friction material such as a fluid silicon oil fills the cavity 86 between the drive shaft 88 and the inside of the driving pinion 80 and constitutes a fluid coupling between the drive shaft 88 and the driving pinion 80 whereby at a predetermined speed of rotation of the drive shaft 88, the fluid in the chamber or cavity 86 will cause a frictional drag therebetween sufficient to couple the driving pinion 80 to the shaft 88.

Figure 3:
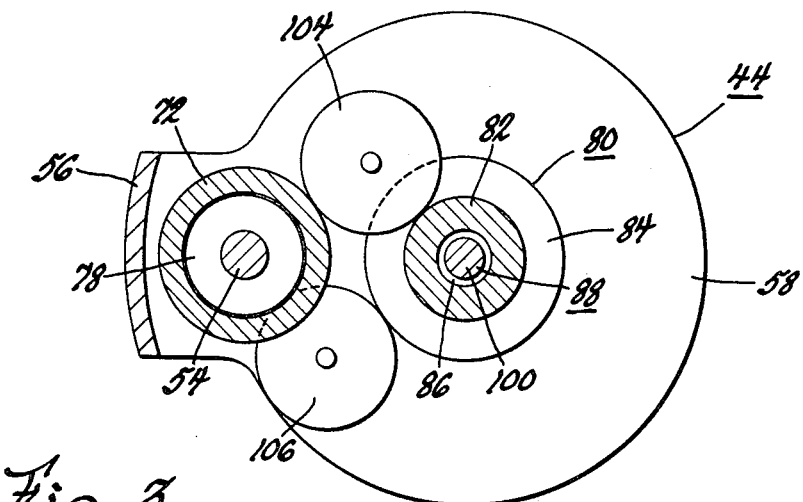
FIGURE 3 is a view in horizontal section taken along the line 3—3 of FIGURE 2.

Diagrammatically shown in FIGURES 2 and 3 is a spin idler roller 104 of the type having a variable center of rotation and of the type associated with means (not shown) to bias the roller 104 against the outer periphery of the small diameter portion 82 of the driving pinion 80 and the outer periphery of the spin drum 72. For further details of a typical idler roller of this type, reference may be had to United States Patent 3,165,911, issued Jan. 19, 1965, to Sisson. In the illustrated arrangement, the spin roller constitutes a friction drive means between the pinion 80 and the spin drum 72 that is operative upon counterclockwise rotation of the driving pinion 80 to be wedged between the driving pinion 80 and the spin drum 72 whereby the drive of the motor 60 will be transferred to the spin shaft 46 to drive the spin drum 48 during a predetermined extraction of the spin cycle of the operation of the washer 10. Likewise, the improved drive mechanism 44 includes a self-energizing agitate friction idler roller 106 disposed between the outer periphery large diameter portion 84 of the driving pinion 80 and the outer periphery of the agitate drum 78. The agitate idler roller 106 likewise is of the type having a free floating center and of the type associated with biasing means as set forth in the Sisson arrangement to locate the drive roller in driving engagement with the pinion 80 and the agitate drum 78 when the pinion 80 is driven in a counterclockwise direction during an agitate cycle of operation of the washer 10 which causes the agitate shaft 54 to operate the mechanism of the nutating agitator 52 to cause it to tilt or wobble about the vertical axis defined by the shaft 54.

In the past, roller drive mechanisms, while suited for their intended purpose in certain types of washing apparatus, for example, one having a nutating agitator of the type illustrated, must operate under high-speed conditions and under a wide range of variable high-level loadings as the agitator is moved in opposite directions within a filled water tub against a substantial clothes loading and during acceleration of the spin tub 50. As a result, the roller components, such as 104, 106 in the illustrated arrangement, are subjected to an uneven wear pattern and at times excessive loading that in certain cases can cause a premature wear of these components. By virture of the above-illustrated arrangement, these problems are minimized since the provision of the particular driving pinion 80 and the drive shaft 88 being fluidly coupled will cause the rollers 103, 106 to be driven at substantially a constant torque irregardless of the variations in load being driven thereby and as a result, the loadings and resultant wear patterns on the roller components 104, 106 are more uniform. Moreover, when uneven loadings are directed against roller components 104, 106, the driving pinion 80 will compensate for these loadings by slipping with respect to the drive shaft 88 whereby the motor is maintained at a predetermined constant speed and required motor wattage can be determined accurately and maintained at a level below that which would otherwise be required to meet extreme loading conditions. Thus, lower cost motors can be used in the system without sacrificing effective washer operation.

Another feature of the illustrated arrangement is that it includes the capability of readily braking the spin tub 50 following the spin cycle of operation without the need for a separate brake assembly in the driving mechanism. The need for such a brake assembly is eliminated since following the spin cycle of operation, which in the illustrated arrangement is obtained by driving the driving pinion 80 in a clockwise direction, a momentary reversal of the motor 44 will cause the drive shaft 88 to be operated in a reverse direction of rotation from the moving components of the transmission and the silicon fluid in the cavity 86 will serve to react against the oppositely rotating driving pinion and its associated drive components to slow down the spin tub.

While the embodiment of the present invention as herein disclosed constitutes a preferred form, it is to be understood that other forms might be adopted.

What is claimed is as follows:

1. In a washing machine mechanism, a spin shaft for driving an extraction tub, an agitate shaft for driving an agitator in said tub, reversible motor means having an output shaft, friction roller means for driving said spin and agitate shafts, and fluid drive means driven by said motor shaft including portions thereon coupled to said roller means for driving said rollers substantially at a constant torque.

2. In the combination of claim 1, support means for said motor means, said spin shaft and said agitate shaft being coaxial with one another and rotatably supported by said support means, said friction roller means being supported on said support means for free lateral movement with respect to said spin and agitate shafts.

3. In the combination of claim 1, said friction roller means including a plurality of self-energizing friction rollers, support means for said motor means, and means for connecting each of said plurality of rollers on said support means for free lateral movement with respect to said agitate and spin shaft, said fluid drive means including a driving pinion having first and second portions thereon each engageable respectively with one of said rollers and operative upon reverse rotation of said motor to drive one of said rollers into driving engagement with said agitate or spin shaft.

4. In the combination of claim 1, said fluid drive means including means operative upon motor reversal to brake the movement of said extraction tub following a predetermined momentary reversal of said motor means.

5. In the combination of claim 1, said fluid drive means including a driving pinion having first and second portions thereon engageable with said roller means and operative upon reverse rotation of said motor means to drive said roller means selectively into driving engagement with said agitate and spin shafts.

6. In the combination of claim 1, said fluid drive means including a driving pinion having a large diameter opening therein, said motor means having a drive shaft directed coaxially through said opening and forming in conjunction with said driving pinion an annular chamber, frictional fluid means in said chamber, means for sealing said chamber against leakage of fluid exteriorly thereof, said drive shaft being driven upon energization of said motor means to be driven relative to said driving pinion, said frictional fluid in said chamber coupling said drive shaft to said driving pinion for rotating said driving pinion at a substantially constant torque under high load and high differential speed conditions.

7. In combination, a first shaft, a second shaft concentric with said first shaft, support means for rotatably supporting said first and second shafts, a first drum fixedly secured to said first shaft, a second drum fixedly secured to said second shaft, a reversible motor secured to said support means including an output shaft, a driving pinion supported by said output shaft, fluid coupling means interconnecting said output shaft to said driving pinion, said driving pinion having first and second portions located in proximity to said first and second drums respectively, first self-energizing friction roller drive means disposed between said first drum and said first pinion portion to be in driving engagement between said driving pinion and said first drum upon a first predetermined rotation of said motor, second self-energizing friction roller drive means disposed between said second drum and second driving pinion portion to be in driving engagement therebetween upon a reverse direction of rotation of said motor, said fluid coupling means between said driving pinion and said output shaft serving to cause said output shaft to drive said roller means at a substantially constant torque.

8. In the combination of claim 7, said fluid coupling means including means operative upon motor reversal to brake the movement of said first drum upon a predetermined momentary reversal of said motor following said first predetermined rotation of said motor.

9. In the combination of claim 7, said driving pinion having a large diameter opening therein, said output shaft being directed coaxially through said opening and forming in conjunction with said driving pinion an annular chamber, frictional fluid means in said chamber, means for sealing said chamber against leakage of fluid exteriorly thereof, said output shaft being driven upon energization of said motor means to be driven relative to said driving pinion, said frictional fluid in said chamber coupling said shaft to said drive pinion, said friction fluid in said chamber coupling said drive shaft to said driving pinion for rotating said driving pinion at a substantially constant torque under high load and high differential speed conditions.

References Cited

UNITED STATES PATENTS

| 2,485,848 | 10/1949 | Sharp | 74—190 |
| 3,331,227 | 7/1967 | Jacobs | 68—23 |
| 3,334,496 | 8/1967 | Roeske | 68—23 |

CORNELIUS J. HUSAR, *Primary Examiner.*